US008358426B2

(12) United States Patent
Morishita

(10) Patent No.: US 8,358,426 B2
(45) Date of Patent: Jan. 22, 2013

(54) IMAGE FORMING APPARATUS DETERMINING A PRINT RESTART TIME AFTER MAINTENANCE

(75) Inventor: Takashi Morishita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 386 days.

(21) Appl. No.: 12/862,934

(22) Filed: Aug. 25, 2010

(65) Prior Publication Data

US 2011/0058207 A1 Mar. 10, 2011

(30) Foreign Application Priority Data

Sep. 9, 2009 (JP) ................................ 2009-208576

(51) Int. Cl.
*G06K 15/00* (2006.01)
*G06F 3/12* (2006.01)

(52) U.S. Cl. ...................... 358/1.12; 358/1.15; 358/1.13

(58) Field of Classification Search ..................... 347/16
See application file for complete search history.

(56) References Cited

U.S. PATENT DOCUMENTS 6,938,974 B2 * 9/2005 Uchida .......................... 347/16
7,506,948 B2 3/2009 Nonaka
2008/0068632 A1 * 3/2008 Fukasawa .................. 358/1.12
2008/0225070 A1 9/2008 Morishita et al.
2009/0058919 A1 3/2009 Horade
2009/0225126 A1 9/2009 Morishita

FOREIGN PATENT DOCUMENTS

JP 2006-082546 3/2006
JP 2009-056705 3/2009

* cited by examiner

*Primary Examiner* — King Poon
*Assistant Examiner* — Ibrahim Siddo
(74) *Attorney, Agent, or Firm* — IPUSA, PLLC

(57) ABSTRACT

In an image forming apparatus, a setting part sets a first waiting time, which lasts from a completion of an ejecting operation of one sheet of recording paper to a start of supply of a subsequent sheet in a one-side printing or a second waiting time, or a second waiting time, which lasts from a completion of ejecting operation of one sheet of recording paper to a start of resupply of the one sheet of recording paper in both-side printing. A determining part detects a difference in time length between the first or second waiting time, a maintenance time required by a head maintenance operation and a cap timer time, which is a time during which a nozzle of the recording head is allowed to be maintained in an uncapped state, and determines a time of restarting a printing operation after execution of the maintenance operation based on the detected difference.

7 Claims, 13 Drawing Sheets

FIG.10

[DRY WAITING TIME SETTING] DIALOG

Both-side printing takes a time longer than regular paper.
Set a time to start next printing so that subsequent
sheet does not overlap before ink is dried.

Both-Side Printing Dry Waiting Time Setting
Set time to start next both-side printing.
In order to validate time setting, check
[both-side printing dry waiting] in [edit] tab.

>Dry Waiting Time
Set dry waiting time within 1 – 20 seconds.

[Return to Standard]
Return all setting contents of this screen to standard values.

IMAGE FORMING APPARATUS DETERMINING A PRINT RESTART TIME AFTER MAINTENANCE

BACKGROUND OF THE INVENTION

1. Field of the Invention

The present invention relates to image forming apparatuses and, more particularly, to an image forming apparatus which is capable of setting a waiting time for drying recording liquid.

2. Description of the Related Art

As an image forming apparatus used in a printer, a facsimile machine, a copy machine, a multi-function peripheral machine, or the like, there is an inkjet image forming apparatus. The inkjet image forming apparatus forms a visible image on a recording medium by injecting droplets of a color liquid from a liquid discharge head of a recording head onto the recording medium while conveying or moving the recording medium. The color liquid is a liquid-type coloring agent including a recording liquid, ink, etc. Hereinafter, the color liquid may be referred to as a recording liquid or ink. The recording medium is not limited to a specific material. The recording medium may be referred to as a medium to be recorded, a paper for recording, a transfer material, a recording paper, etc. The image formation performed by the inkjet image forming apparatus may include recording, printing, image printing, character printing.

When the inkjet image forming apparatus performs continuous printing, printed papers are ejected onto a paper eject tray one after another. Thus, in a case where printing is performed under a circumstance where it is difficult to dry ink in a short time or in a case where a solid image using a large amount of ink is printed on the paper, a printed paper may be ejected onto a previously ejected paper, which has been ejected onto the paper eject tray and ink discharged thereon has not been dried yet, or when a both-side printing is performed, a printed paper of which ink is discharged thereon has not been dried yet. Thus, the ink on one paper, which has not been dried completely, may be brought into contact with and rubbed by another paper or parts of a conveyance device, which causes a problem in that undried ink contaminates the printed paper.

In order to solve the above-mentioned problem, there is suggested a technique to prevent an ink contamination by setting a waiting time for drying ink. That is, a paper feeding operation is restarted after waiting for passage of the waiting time for drying ink after a preceding paper was ejected onto the paper eject tray.

According to such a conventional technique, a user sets the waiting time for ink drying so that a printing operation for a subsequent paper is started when the waiting time for drying ink has passed after a preceding paper is ejected onto a paper eject tray. However, in such a conventional technique, if a maintenance operation for a head is needed between consecutive printing operations, the waiting time for drying ink is counted after the maintenance operation has completed. Accordingly, there may be a problem in that an unnecessary waiting time must be passed even though a sufficient time for drying ink is passed due to a time spent on the maintenance operation.

Japanese Laid-Open Patent Application No. 2009-56705 discloses a technique to solve the above-mentioned problem by performing a maintenance operation to be completed within the waiting time for drying ink. However, this technique merely selects a maintenance operation, which can be completed within the waiting time for drying ink. Thus, a state where a necessary maintenance operation is not selected may be continuously maintained, which causes a problem of insufficient recovery of a head condition and incomplete maintenance.

SUMMARY OF THE INVENTION

It is a general object of the present invention to provide an image forming apparatus in which the above-mentioned problems are eliminated.

A more specific object of the present invention is to provide an image forming apparatus, which can restart a printing operation without waiting for passage of an unnecessary time after completion of a head maintenance operation.

In order to achieve the object, there is provided according to one aspect of the present invention an image forming apparatus comprising: a setting part configured to set at least one of a first waiting time and a second waiting time, the first waiting time from a completion of an ejecting operation of one sheet of recording paper to a start of supply of a subsequent sheet of recording paper in a one-side printing, the second waiting time from a completion of ejecting operation of one sheet of recording paper to a start of resupply of the one sheet of recording paper in both-side printing; a recording head maintenance part configured to start a maintenance operation of a recording head simultaneously with a start of a counting operation of the first or second waiting time; and a determining part configured to detect a difference in time length between the first or second waiting time, a maintenance time required by the maintenance operation and a cap timer time, which is a time during which a nozzle of the recording head is allowed to be maintained in a state where the nozzle is uncapped, and to determine a time of restarting a printing operation after execution of the maintenance operation based on the detected difference.

There is provided according to another aspect of the present invention a computer readable recording medium storing an image forming program causing an image forming apparatus to perform an image forming method, the image forming apparatus including: a setting part configured to set at least one of a first waiting time and a second waiting time, the first waiting time from a completion of ejecting operation of one sheet of recording paper to a start of supply of a subsequent sheet of recording paper in a one-side printing, the second waiting time from a completion of ejecting operation of one sheet of recording paper to a start of resupply of the one sheet of recording paper in both-side printing; and a recording head maintenance part configured to start a maintenance operation of a recording head simultaneously with a start of a counting operation of the first or second waiting time, the image forming method comprising: detecting a difference in time length between the first or second waiting time, a maintenance time required by the maintenance operation, and a cap timer time, which is a time during which a nozzle of the recording head is allowed to be maintained in a state where the nozzle is uncapped; determining a time of restarting a printing operation after execution of the maintenance operation based on the detected difference; and causing the image forming apparatus to restart the printing operation at the determined time.

According to the above-mentioned invention, the image forming apparatus can restart the printing operation without waiting for passage of an unnecessary time after completion of the maintenance operation.

Other objects, features and advantages of the present invention will become more apparent from the following detailed description when read in conjunction with the accompanying drawings.

BRIEF DESCRIPTION OF THE DRAWINGS

FIG. 10 is an illustration of a help screen;

DETAILED DESCRIPTION OF THE PREFERRED EMBODIMENTS

A description will be given below, with reference to the drawings, of embodiments of the present invention.

Figure 1:
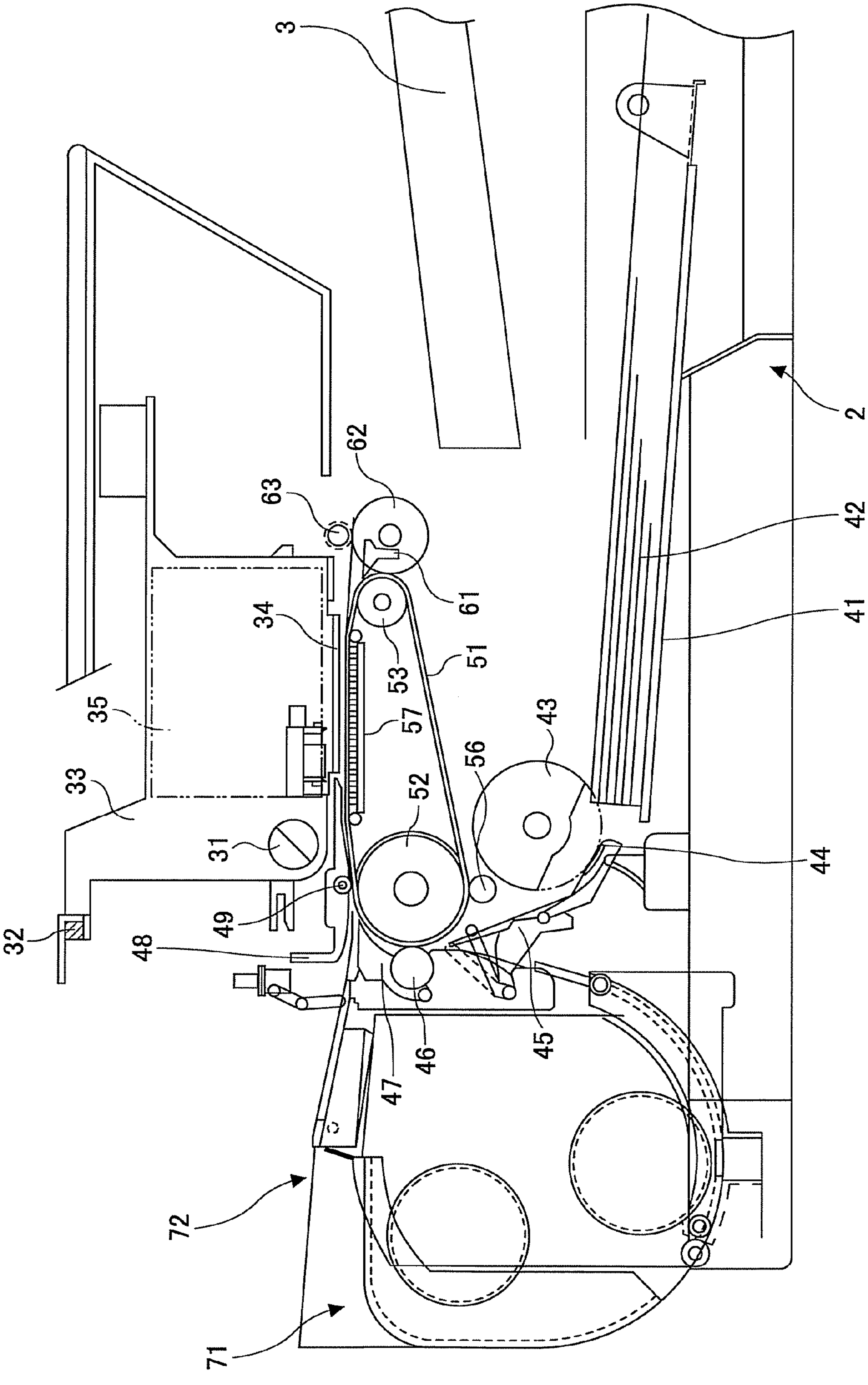
FIG. 1 is a side view of an inkjet recording apparatus according to an embodiment of the present invention.
Figure 2:
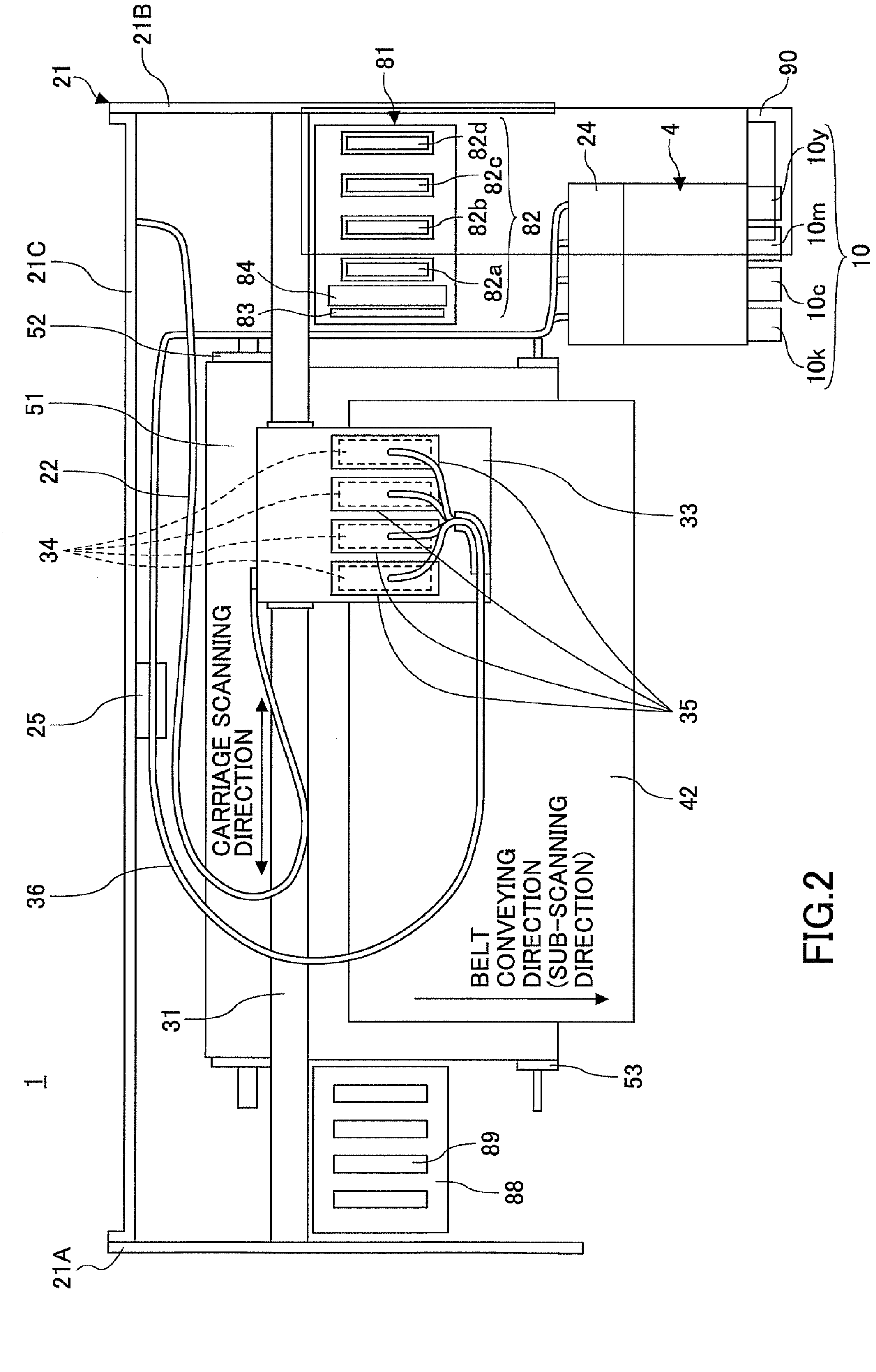
FIG. 2 is a plan view of the inkjet recording apparatus illustrated in FIG. 1.

FIG. 1 is a side view of an inkjet recording apparatus according to an embodiment of the present invention. FIG. 2 is a plan view of the inkjet recording apparatus illustrated in FIG. 1. The inkjet recording apparatus 1 has a frame 21 including left and right side plates 21A and 21B. A carriage 33 is supported slidably in a main scanning direction by a guide rod 31 and a stay 32 that are guide members bridged between the side plates 21A and 21B. The carriage 33 is movable by a main scanning motor (not illustrated in the figures) through a timing belt (not illustrated in the figure) in a direction (carriage main scanning direction) indicated by an arrow in FIG. 2.

As illustrated in FIG. 2, four recording heads 34, each including a liquid droplet discharge head discharging ink droplets of yellow (Y), cyan (C), magenta (M) or black (Bk), are provided in the carriage 33. The recording heads 34 are arranged in a direction perpendicular to the main scanning direction so that a discharge direction of ink droplets is in a vertical direction.

As for a pressure generating means provided in the inkjet head constituting the recording head 34, a piezoelectric actuator, a thermal actuator, a shape memory alloy actuator, an electrostatic actuator, etc., may be used. The piezoelectric actuator is an actuator using a piezoelectric element. The thermal actuator uses a phase change due to a film boiling caused by a heat generated by an electro-thermal conversion element such as a resistance heating element. The shape memory alloy actuator uses a metal phase change due to a temperature change. The electrostatic actuator is an actuator using an electrostatic force.

All of ink discharge ports can be driven not only simultaneously but also time-divisionally. If all of ink discharge ports are driven simultaneously, there may be a disadvantage such as deterioration in a recording quality due to cross-talking between the ink discharge ports and an increase in a capacity of a power supply due to a large current to be supplied on a temporary basis. However, such a disadvantage can be avoided by using a time-divisional drive.

A driver IC is mounted on each recording head 34, and the driver IC is connected to a control part (not illustrated in the figures) through a harness 22 (a flexible printed cable).

Sub-tanks 35 for each color to supply each color ink are mounted on the carriage 33. Ink of each color is supplied from ink cartridges 10*k*, 10*c*, 10*m* and 10*y*, which are attached to a cartridge holder serving as a cartridge attaching part, to the sub-tanks 35 through ink supply tubes 36, respectively. Hereinafter, the ink cartridges 10*k*, 10*c*, 10*m* and 10*y* may be collectively referred to as an ink cartridge 10. The cartridge holder 4 is provided with a supply unit 24 for delivering ink in the ink cartridge 10. The ink supply tubes 36 are fixed by an engaging member 25 to a rear plate 21C constituting the frame of the image forming apparatus 10 at the middle of the ink supply tubes 36.

A paper supply part feeds papers 42 stacked on a paper stacking part (pressure plate) 41 of a paper supply tray 2. The paper supply part includes a paper supply roller (half-moon roller) 43 and a separation pad 44 facing the paper supply roller 43. The half-moon roller 43 separates and feeds the papers 42 one after another from the paper stacking part 41. The separation pad 44 is made of a material having a large friction coefficient, and is urged toward the paper supply roller 43.

A guide member 45, a counter roller 46, a conveyance guide member 47 and a press member 48 are provided to convey the papers 42 supplied from the paper supply part to a position under the recording heads 34. The guide member 45 guides the papers 42. The press member 48 has an end pressure roller 49. A conveyance belt 51, which is a conveyance means, conveys the papers 42 to a position facing the recording heads 34 by electro-statically attracting the papers 42 thereto.

The conveyance belt 51 is an endless belt, which is engaged between a conveyance roller 52 and a tension roller 53 to rotate in a belt conveyance direction (sub-scanning direction). For example, the conveyance belt 51 includes a front layer, which serves as a paper attracting surface and formed of ETFE pure material, and a back layer (a middle resistance layer, a ground layer), which is formed of the same material as the front layer. A resistance of the back layer is controlled by carbon.

The inkjet recording apparatus 10 is equipped with a charge roller 56, which is a charge part to charge a surface of the conveyance belt 51. The charge roller 56 is arranged to contact with the surface of the conveyance belt 51 and is rotated in association with a rotation of the conveyance belt 51. The charge roller 56 is arranged to apply a predetermined pressing force to the conveyance belt 51. The conveyance roller 52 plays a roll of an earth roller by being brought into contact with the middle resistance layer (back layer) of the conveyance belt 51.

A guide member 57 is arranged on the backside of the conveyance belt 51 in correspondence to the printing area of the recording heads 34. An upper surface of the guide member 57 protrudes into the side of the recording heads 34 from a line connecting circumferences of the conveyance roller 52 and the tension roller 53 in order to maintain an accurate flatness of the conveyance roller 51.

The conveyance belt 51 rotates in the belt conveyance direction (sub-scanning direction) indicated in FIG. 2 by the conveyance roller 52 being driven by a sub-scanning motor (not illustrated in the figures).

A separation claw 61 and paper eject rollers 62 and 63 together form a paper eject part to eject the paper 42 on which an image has been formed by the recording heads 34. The separation claw 61 separates the paper 42 from the conveyance belt 51, and the separated paper 42 is conveyed by being caught between the paper eject rollers 62 and 63. A position between the paper eject rollers 62 and 63 is considerably higher than the paper eject tray 3 so that a large number of papers 42 can be accommodated in the paper eject tray 3.

A both-side unit 71 is detachably attached to a rear side part of the apparatus body of the inkjet recording apparatus 1. The paper 42, which is returned by a reverse rotation of the conveyance belt 51, enters the both-side unit 71. The paper 42 in the both-side unit 71 is inverted and fed to the position between the counter roller 46 and the conveyance belt 61. An upper surface of the both-side unit 71 is configured to serve as a manual paper feed tray 72.

Furthermore, as illustrated in FIG. 2, a maintenance and recovery mechanism 81 is arranged in a non-printing area on one side in the scanning direction of the carriage 33. The maintenance and recovery mechanism 81 is provided for maintaining a condition of the nozzles of the recording heads 34, and includes a recovery means or recovery unit to recover the performance of the recording heads 34. A waste liquid tank 90 is arranged under the maintenance and recovery mechanism 81 to store ink collected by the maintenance and recovery mechanism 81. The maintenance and recovery mechanism 81 includes cap members 82*a* through 82*d*, a wiper blade 83 and an ink receiver 84. The cap members 82*a* through 82*d* may be collectively referred to as a cap 82. The cap 32 is provided to cap the nozzle surface of each of the recording heads 34. The wiper blade 83 is a blade member for wiping the nozzle surfaces of the recording heads 34. The ink receiver 84 receives droplets of ink ejected by a so-called empty discharge, which is performed to discharge ink (recording liquid) of which viscosity is increased. In the present embodiment, the cap member 82*a* is used as a cap for suction and maintaining moisture, and each of the cape members 82*b* through 82*d* is used as a cap for maintaining moisture.

The ink ejected into the cap 82 is discharged into and stored in a waste liquid tank 90. The ink adheres onto the wiper blade 83 and removed by a wiper cleaner and the ink discharged into the ink receiver 84 is discharged into and stored in a waste liquid tank (not illustrated in the figures) located under the maintenance and recovery mechanism 81.

As illustrated in FIG. 2, an ink receiver 88 is arranged in a non-printing area on the opposite side in the scanning direction of the carriage 33. The ink receiver 88 receives droplets of ink ejected by an empty discharge, which is performed to eject droplets of ink of which viscosity has been increased during recording and which do not contribute to the recording. The ink receiver 88 is provided with openings 89 arranged along the aligning direction of the recording heads 34.

A communication circuit part (interface), such as a USB for exchanging data with a host, is provided on a rear side of the interior of the apparatus body of the inkjet recording apparatus 1. Also a control circuit board, which constitutes a control part to control an entire part of the inkjet recording apparatus 1, is provided in the interior of the apparatus body of the inkjet recording apparatus 1.

In the inkjet recording apparatus 1 having the above-mentioned structure, the papers 42 are separated and fed one by one from the paper supply tray 2 and the papers 42 are fed vertically upward. Then, the papers 42 are guided by the guide member 45 to a position between the conveyance belt 51 and the counter roller 46. The papers 42 are pinched between the conveyance belt 51 and the counter roller 47, and are pressed onto the conveyance belt 51 by the end pressure roller 49 to change the conveyance direction by about 90 degrees.

At this state, an alternating voltage is applied from an AC bias supply part to the charge roller 56 to charge the surface of the conveyance belt 51. Specifically, an alternating voltage of a plus and a minus is applied to the conveyance belt 51 so that the conveyance belt 51 is charged in a charge voltage pattern in which a plus and a minus are alternatively charged with a predetermined width in a rotating direction, which is coincident with the sub-scanning direction. When the papers 42 are fed onto the thus-charged conveyance belt 51, the papers 42 are electro-statically attracted by the conveyance belt 51, and the papers 42 are conveyed in the sub-scanning direction by the travel of the conveyance belt 51.

Then, droplets of ink are discharged onto one of the papers 42 by driving the recording heads 34 in accordance with an image signal while moving the carriage 33 to record a part of an image corresponding to one line. Thereafter, the paper 42 is conveyed by a predetermined distance, and recording a part of the image corresponding to a subsequent line is performed. The recording operation is ended when a recording end signal is supplied or a signal indicating that a trailing edge of the paper 42 reached the recording area is supplied, and the paper 42 is ejected onto the paper eject tray 3.

During a printing (recording) standby state, the carriage 33 is moved to the side of the maintenance and recovery mechanism 81. In this state, the recording heads 34 are capped by the cap 82 to prevent a discharge failure due to dried ink by maintaining the nozzles in a moisturized state. Additionally, ink is suctioned from the nozzle by a suction pump (not illustrated in the figures) in the state where the recording heads 34 are capped by the cap 82 in order to perform a recovery operation to eject bubbles and ink of which viscosity has been increased. The ink ejected at this time is stored in the waste liquid tank 90. Additionally an empty discharge operation is performed before start recording or during recording. Thereby, the stable discharge performance of the recording heads 34 is maintained.

Figure 3:
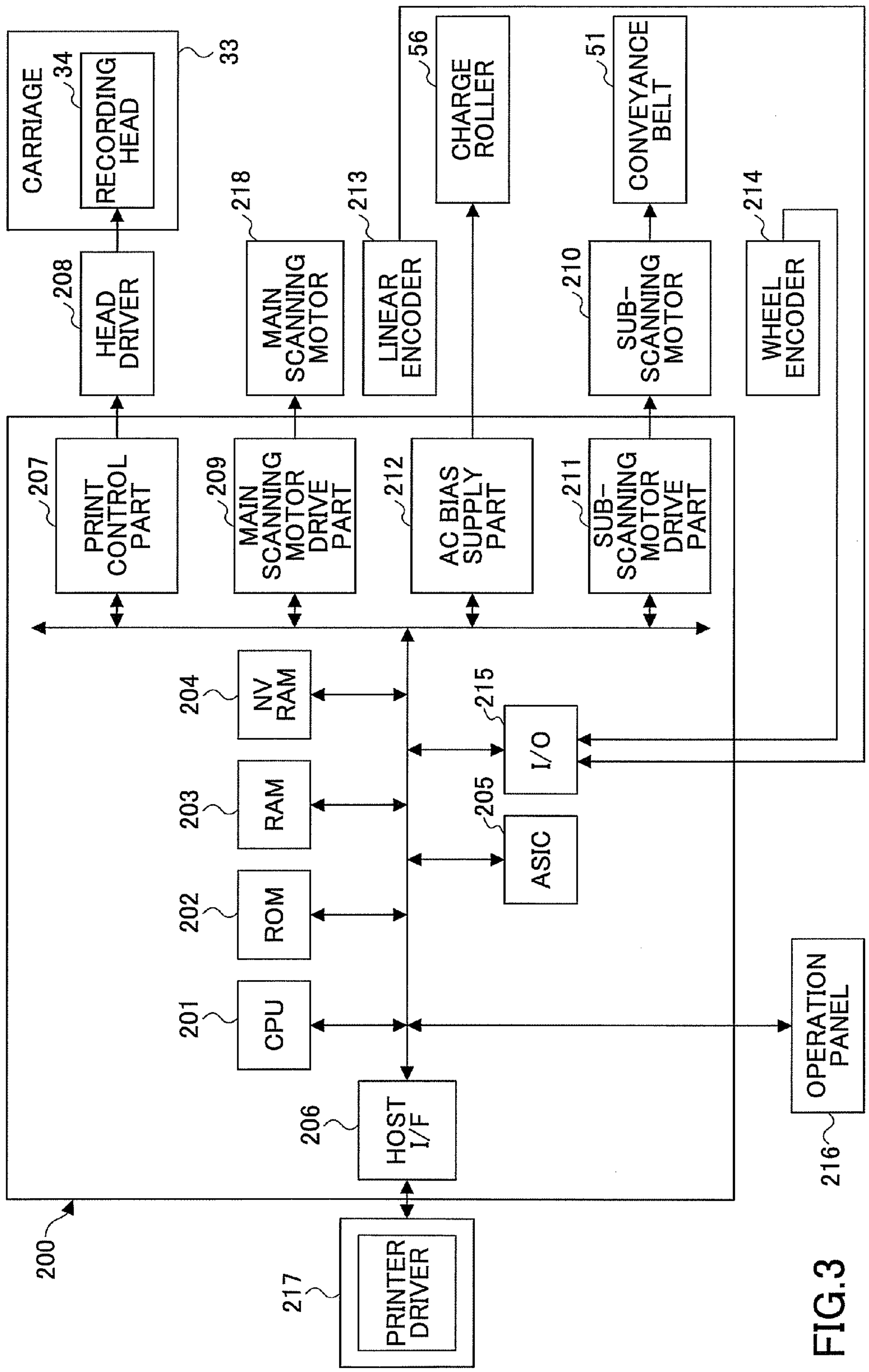
FIG. 3 is a block diagram of a control part of the inkjet recording apparatus.

A description will be given below of an outline of the control part of the inkjet recording apparatus 1. FIG. 3 is a block diagram of the control part 200 of the inkjet recording apparatus 1, which is an example of an image forming apparatus according to the present embodiment. The control part 200 causes the inkjet recording apparatus 1 to serve as a determining means (a determining unit including a CPU 201, an ASIC 205, etc.), a setting means (a setting unit including a ROM 202, a RAM 203, an I/O 215, etc.), and a recording head maintenance means (a recording head maintenance unit).

The control part 200 includes the CPU 201, the ROM 202, the RAM 204, a rewritable nonvolatile memory (NVRAM) 204, and the ASIC 205. The CPU 201 controls the entire operation of the inkjet recording apparatus 1 and also controls a conveyance operation of the papers 42 and a moving operation of the recording heads 34. The ROM 202 stores programs executed by the CPU 201 and other fixed data. The RAM 203 temporarily stores image data and other data. The NVRAM 204 retains data while a power of the inkjet recording apparatus 1 is turned off. The ASIC 205 performs various kinds of signal processing on the image data and image processing to perform rearrangement, and also performs processing on input and output signals for controlling the entire apparatus.

The control part also includes a host I/F 206, a print control part 207, a main scanning motor drive part 209, a sub-scanning motor drive part 211, an AC bias supply part 212, and an I/O 215. The host I/F 206 interfaces with a host to exchange data and signals. The print control part 207 generates a drive waveform to drive the recording heads 34, and outputs to a head driver 208 image data to selectively drive a pressure generating means of the recoding heads 34 and various kinds of data associated with the image data. The main scanning motor drive part 209 drives a main scanning motor 218. The sub-scanning motor drive part 211 drives a sub-scanning motor 210. The AC bias supply part 212 supplies an AC bias to the charge roller 56. The I/O 215 inputs detection pulses from the linear encoder 214 and the wheel encoder 214 and detection signals from other kinds of sensors.

The control part 200 is connected to an operation panel 216 (a display part) to input and display information necessary for operating the inkjet recording apparatus 1.

The control part 200 receives print data by the host I/F 206 through a cable or a network. The print data is generated by a printer driver 217 of an image reading apparatus such as an image scanner, or a host apparatus (information processing apparatus, an external apparatus) including an image taking apparatus such as a digital camera.

Then, the CPU 201 reads and analyzes the print data in a reception buffer of the host I/F 206. The ASIC 205 applies a necessary image processing and data rearrangement processing, and transfers the print data to the print control part 207. The print control part 207 outputs image data and a drive waveform to the head driver 208 at an appropriate timing.

The dot pattern data to be output as an image can be generated according to font data stored in the ROM 202. Alternatively, the image data may be developed to bit map data by the printer driver 217 of the host side, and is transferred to the inkjet recording apparatus 1.

A drive waveform generation part (not illustrated in the figure) of the printing control part 207 includes a D/A converter and an amplifier. The D/A converter performs a digital-to-analog conversion of pattern data of drive pulses stored in the ROM 202 and read by the CPU 201. The print control part 207 outputs the drive waveform including one drive pulse or a plurality of drive pulses to the head driver 208.

The head driver 208 drives the recording heads 34 by selectively applying drive pulses, which form a drive waveform given by the drive waveform generating part of the print control part 207, to the pressure generating means of the recording heads 34 based on the image data (dot pattern data) corresponding to one line of the recording heads 34. The head driver 208 includes a shift register, a latch circuit, a level conversion circuit (a level shifter) and an analog switch array (a switch). The shift register inputs serial data, which is, for example, a clock signal and image data. The latch circuit latches a register value of the shift register by a latch signal. The analog switch array is on-off controlled by the level shifter. The head driver 208 selectively applies desired drive pulses included in the drive waveform to the pressure generating means of the recording heads 34 by controlling on/off of the analog switch array.

Figure 4:
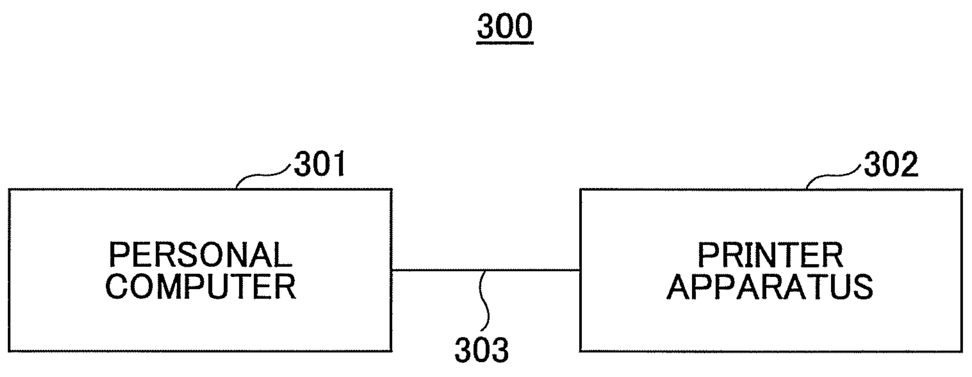
FIG. 4 is an illustration of an image forming system according to an embodiment of the present invention.

The inkjet recording apparatus 1 as an example of the image forming apparatus according to the present embodiment may be connected to a personal computer as an information processing apparatus, as illustrated in FIG. 4, in order to constitute an image forming system (a print system). In this embodiment, the image forming system 300 includes the personal computer 301 and the printer apparatus (a printer) 302 are connected to each other through a cable 303. The personal computer 301 is an example of an information processing apparatus (a host PC), which is a host apparatus for sending a print job containing print data and print condition information for printing the print data. The printer apparatus 302 is an example of an image forming apparatus for printing print data such as, for example, the above-mentioned inkjet recording apparatus 1.

The personal computer 301 sends to the printer apparatus 302 the print data corresponding to a created document and print condition data set for printing the document. The print condition data contains various kinds of information such as, for example, paper orientation, both-side printing, consolidation printing, binding, punching, enlarge/reduction, etc.

On the other hand, the printer apparatus 302 prints the print data according to the print job sent from the personal computer 301. Specifically, the printer apparatus 302 prints the print data contained in the print job on a medium such as a recording paper in accordance with the print condition data contained in the print job.

Figure 5:
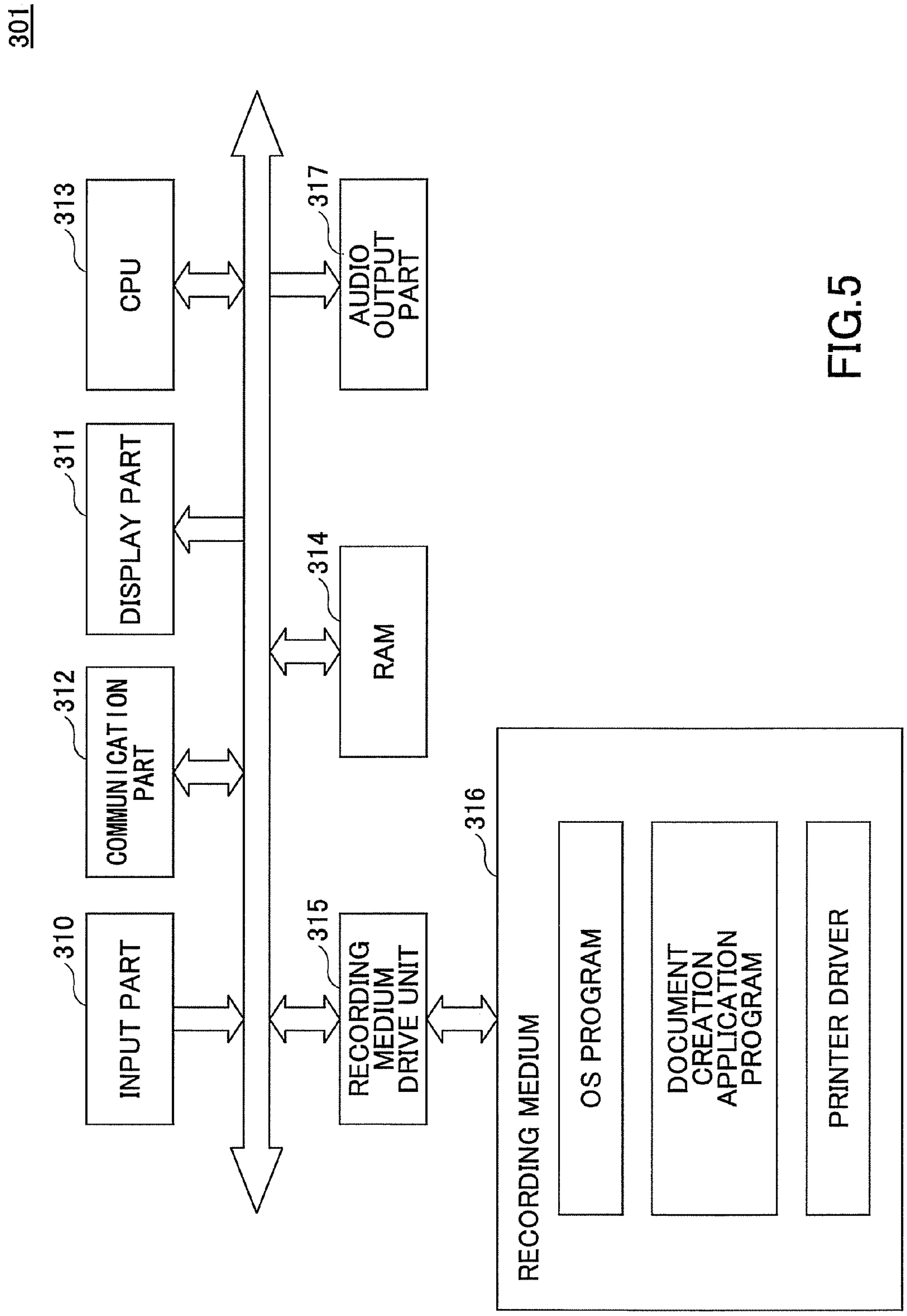
FIG. 5 is a block diagram of an image forming apparatus included in the image forming system.

FIG. 5 is a block diagram of the personal computer 301 as an example of the information processing apparatus. The personal computer 301 includes an input part 310 for inputting data, a display part 311 such as a display unit, a communication part 312 for performing communication, a CPU 313 as a control means for controlling the entire apparatus, a RAM 314 used as a work area of the CPU 313, a recording medium drive apparatus 315 for performing read/write of data on a recording medium, a recording medium 316 storing various kinds of programs for driving the CPU 313, and an audio output part 317 for outputting a sound.

The input part 310 is a user interface for a user to input an operation instruction and data. The input part 310 includes a keyboard having cursor, number input keys, and various function keys, and a mouse pointer for performing designation of a key on a display screen of the display part 311.

The display part 311 includes a CRT, an LCD, etc., to display information corresponding to display data input from the CPU 313. The communication part 312 is for carrying out data communication with an external apparatus. For example, the communication part 312 performs data communication with the printer apparatus 302 through the cable 303.

The CPU 313 is a central control unit, which controls the entire apparatus in accordance with programs stored in the recording medium 316. The CPU 313 is connected with an input part 310, a display part 311, a communication part 312, a RAM 314, a recording-medium drive apparatus 315, etc. The CPU 313 controls data communication, reading of an application program by accessing a memory, reading/writing of various kinds of data, inputting of data/command, displaying of information on the display part 311, etc. The CPU 313 sends the print data input from the input part 310 and print condition data of the print data as a print job to the printer apparatus 302 through the communication part 312.

The RAM 314 includes a work memory and a display memory. The work memory stores a designated program, an input instruction, input data and processing result information. The display memory temporarily stores display data to be displayed on a display screen of the display part 311.

The recording medium 316 stores various kinds of programs and data such as, for example, an OS program which the CPU 313 can execute (for example, the Windows XP (registered trademark) operating system of Microsoft), a document creation application program, a printer driver corresponding to the printer apparatus 302, etc. As for the recording medium 316, an optical, magnetic or electrical recording medium such as, for example, a flexible disk, a hard disk, a CD-ROM, a DVD-ROM, an MO, a PC card, etc., may be used.

Various programs are stored in the recording medium 316 according to a data format which the CPU 313 can read. Various programs may be previously stored in the recording medium 316 or stored in the recording medium 316 by being downloaded through a communication line such as the Internet or the like.

Figure 6:
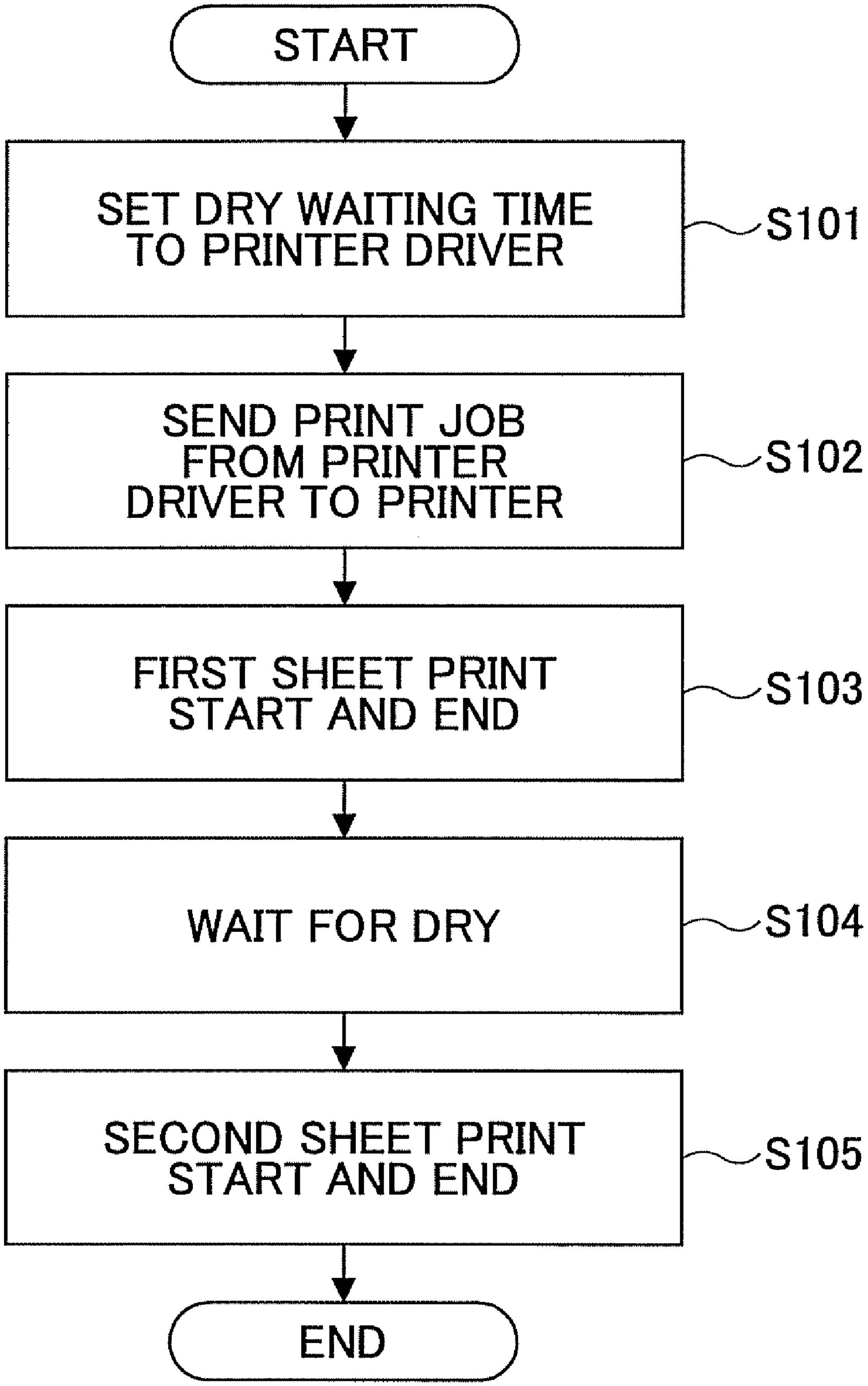
FIG. 6 is a flowchart of a process of printing two pages by setting a dry waiting time.

A description will be given below of a page interval maintenance control performed during a waiting time for drying ink (hereinafter, referred to as a dry waiting time) by the image forming apparatus according to the present embodiment. FIG. 6 is a flowchart of a process of printing two pages by setting a dry waiting time.

First, a user sets a dry waiting time to the printer driver 217 (S101). The dry waiting time can be set to an arbitrary time period (for example, a few seconds). Although an example of setting the dry waiting time to the printer driver 217 of the image forming system 300 is explained below, the dry waiting time may be set directly to the image forming apparatus itself. In such a case, the image forming apparatus may be configured so that the same operation as mentioned below can be done through the operation panel 216 of the image forming apparatus.

Figure 7:
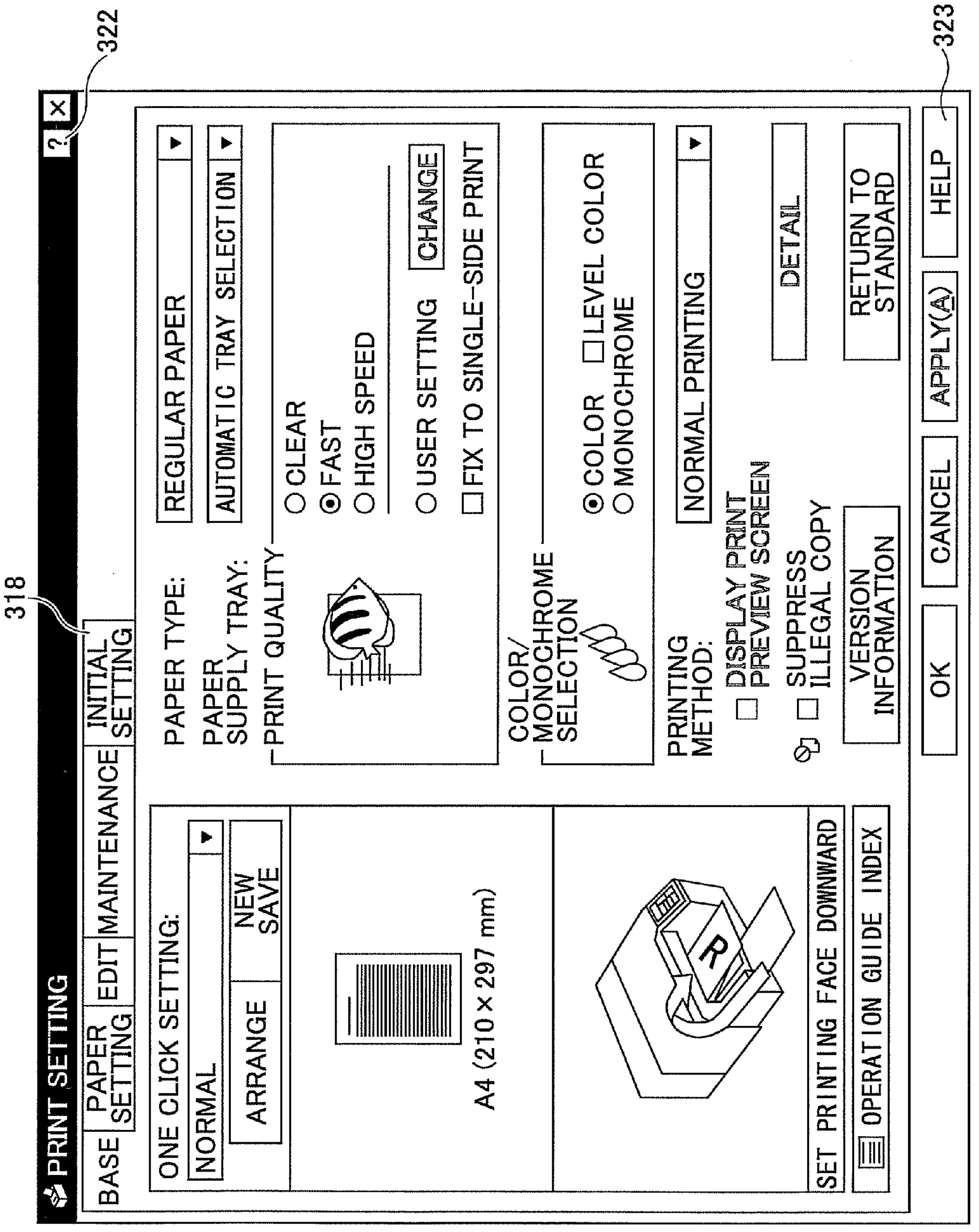
FIG. 7 is an illustration of an initial setting screen.
Figure 8:
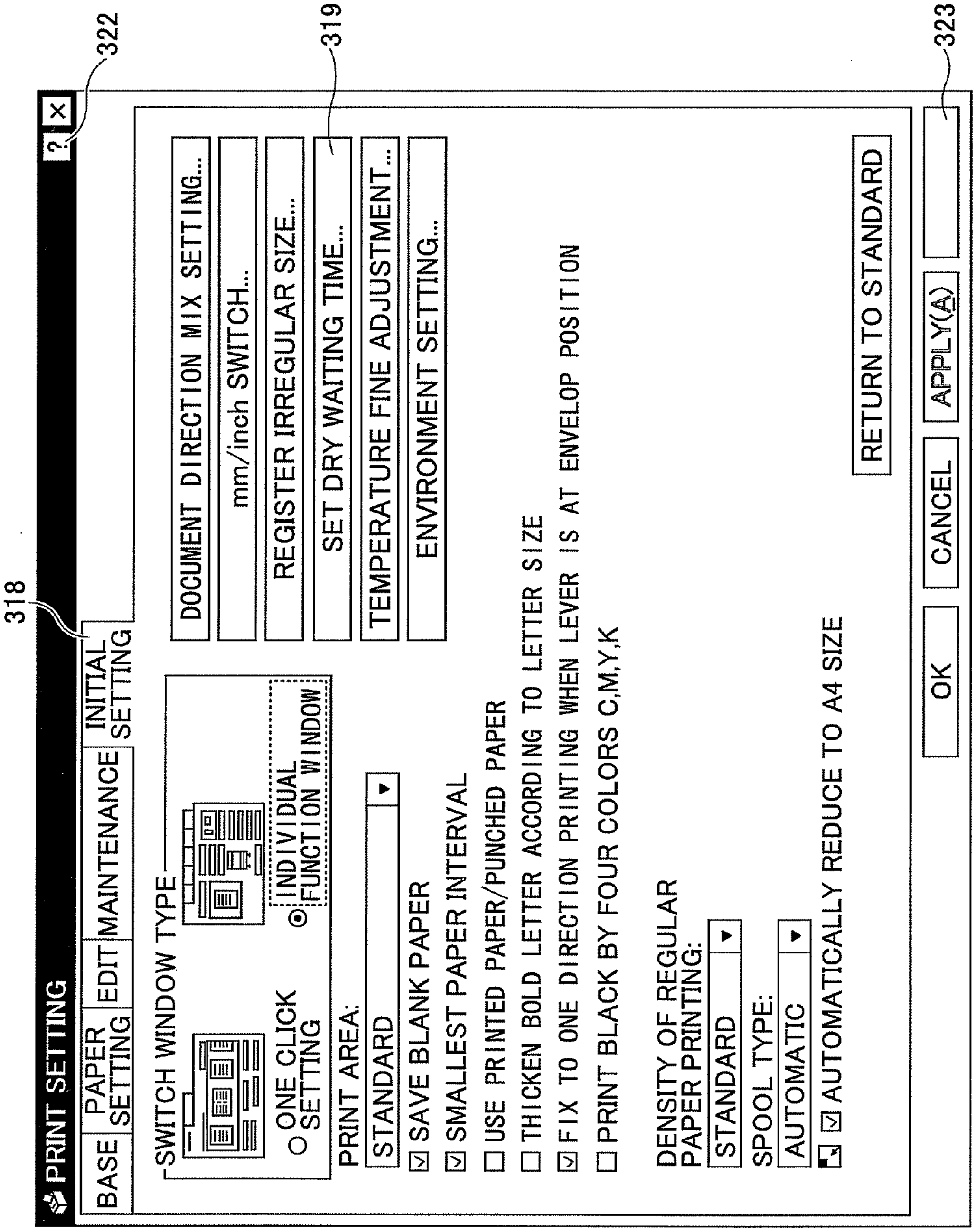
FIG. 8 is an illustration of a print setting screen.

A description is given below, with reference to FIG. 7 through FIG. 10, of a specific example of setting a dry waiting time to the printer driver 217. When the user opens a print setting screen of the printer apparatus 302 from the personal computer 301 of the host side, a print setting screen such as illustrated in FIG. 7 is displayed on the display part 311. If the user selects an initial setting tag 318 from the initial screen, a setting screen such as illustrated in FIG. 8 is displayed. Further, if the user selects a dry waiting time setting 319 from the setting screen, a dry waiting time setting screen such as illustrated in FIG. 9 is displayed.

Conventionally, the dry waiting time is set only for both-side printing. However, there may be a case where an edge of the paper 42 is contaminated by ink because a subsequent paper 42 rubs the preceding paper 42, which has been ejected onto the paper eject tray 3 and ink has not been completely dried yet, especially in an environment where it is difficult to dry ink in a short time. Thus, in the present embodiment, a dry waiting time for one-side printing and a dry waiting time for both-side printing can be separately set by inputting or selecting values in the input windows 320 and 321 as illustrated in FIG. 9. In the present embodiment, the dry waiting time corresponds to a time period from a reverse preparation response to a reverse request in the case of both-side printing, and, on the other hand, the dry waiting time corresponds to a time period from a paper eject response to paper supply request in the case of one-side printing. The dry waiting time is not always necessarily set for both the both-side printing and the one-side printing, and may be set for only one of the both-side printing and the one-side printing. Although the dry waiting time for both-side printing and the dry waiting time for one-side printing can be set to a value from 1 second to 20 seconds in the example illustrated in FIG. 9 and FIG. 10, the range of the setting value is not limited to the range from 1 second to 20 seconds. The setting is not limited to a specific value, and may be selected from appropriate values in response to a property of ink used, a type of paper to be printed, etc.

Figure 9:
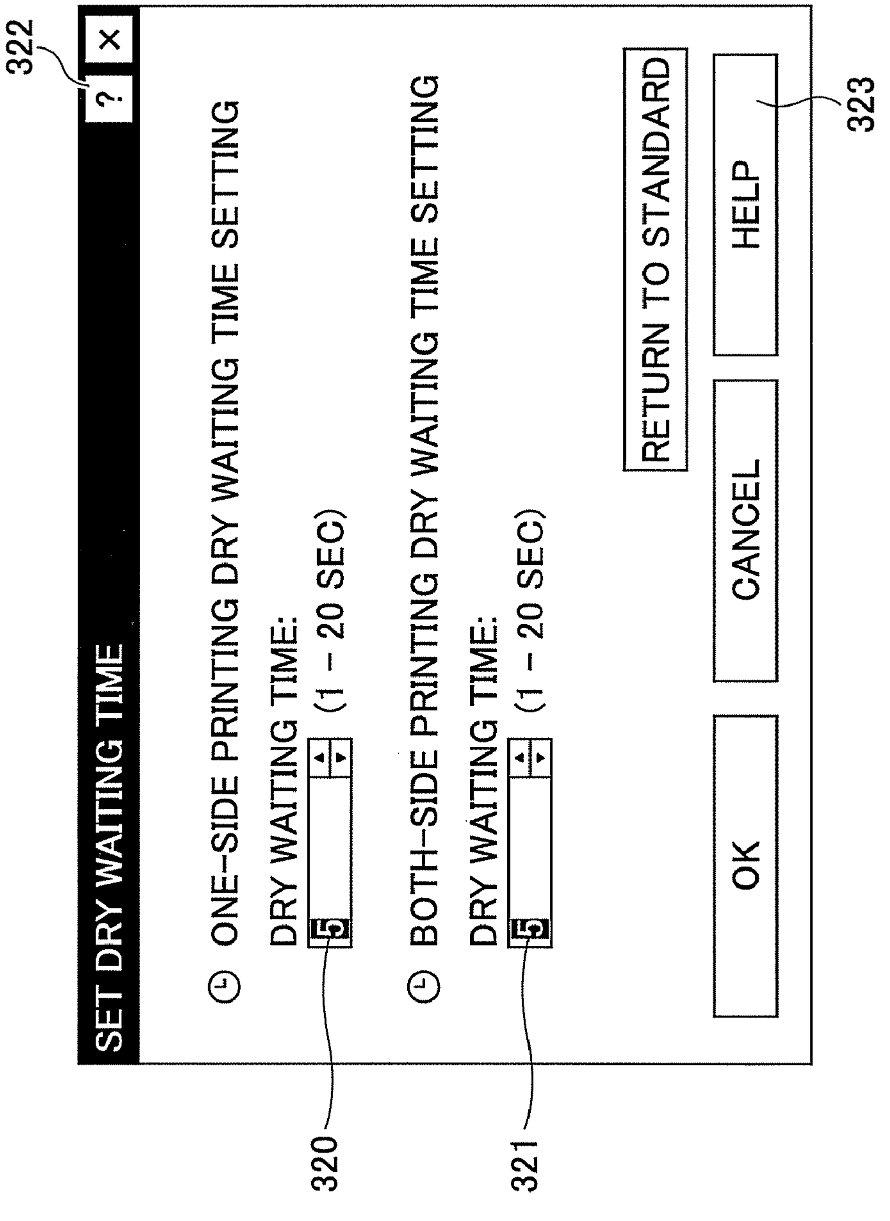
FIG. 9 is an illustration of a dry waiting time setting screen

In the setting screens illustrated in FIG. 7 through FIG. 9, an explanation such as, for example, illustrated in FIG. 10 can be displayed by selecting help buttons 322 and 323. FIG. 10 illustrates a case where only both-side printing can be set.

In a state where the dry waiting time is set to the printer driver 217 (S101), a print job is sent from the printer driver 217 to the printer apparatus 302 (S102). Thus, a printing operation for a first sheet is performed (S103). After the printing operation of the first page is completed, passage of the time period set by the dry waiting time is waited for (S104: wait for dry), and, then, a printing operation for a second sheet is started. Although one-side printing is explained in the example of FIG. 6, if it is a both-side printing, the first sheet corresponds to the front side and a second sheet corresponds to the backside. Specifically, when the printing operation of the front side is started and completed, a feeding operation to feed the paper for the backside printing is started after waiting for passage of the time period set as the dry waiting time.

Figure 11:
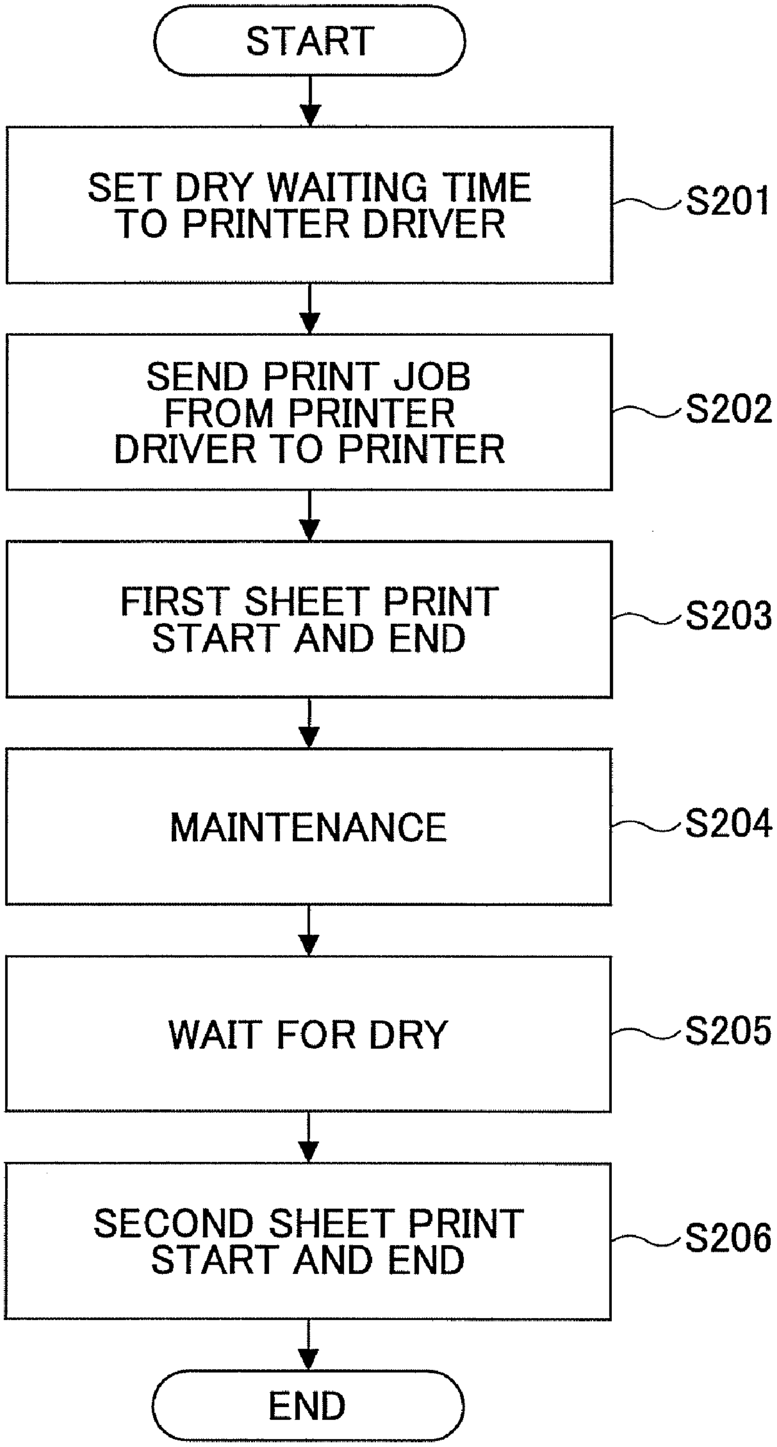
FIG. 11 is a flowchart of a two-page printing operation by setting a dry waiting time.

A description will now be given of a process of a two-page printing operation by setting a dry waiting time for the sake of comparison with the printing operation according to the present embodiment. FIG. 11 is a flowchart of a two-page printing operation by setting a dry waiting time.

First, a user sets a dry waiting time to the printer driver 217 first (S201). Then, a print job is sent from the printer drive 217 to the printer apparatus 302 (S202). Thus, a printing operation for a first sheet is started and completed. After a paper-eject operation is completed (S203), if maintenance is needed between printing operations of two sheets, a maintenance operation is started (S204: maintenance). After waiting for passage of the time period set by the dry waiting time (S205: wait for dry) after completion of the maintenance operation, a printing operation for a second sheet is started (S206).

In the above-mentioned process, if maintenance of a head is required between the printing operations of two sheets (pages), passage of the time period for drying ink is waited for after completion of the maintenance operation even when a sufficient time for drying ink has been already taken due to the time period spent on the maintenance operation, which may result in an unnecessarily long time before starting a next printing operation. Such a maintenance operation of a head performed between the printing operations of two sheets (pages) may be referred to as a page interval operation.

Thus, in order to eliminate such a problem, the image forming apparatus (inkjet recording apparatus 1) according to the present embodiment, if it is necessary to perform the page interval maintenance operation and waiting for dying ink simultaneously, the image forming apparatus performs the page interval maintenance operation simultaneously with a waiting process of waiting for drying ink. Further, the image forming apparatus (inkjet recording apparatus 1) according to the present embodiment compares a previously set "dry waiting time", a time period taken by the page interval maintenance operation, and a cap timer time with each other, in order to perform the following control based on a result of the comparison.

The above-mentioned comparison and determination may be performed by the CPU 201, and, alternatively, performed by, for example, the ASIC 205 or the printer driver 217. If the comparison and determination are performed by the printer driver 217, the result may be sent to the printer side.

Here, the "page interval maintenance" is a maintenance operation performed on the recording heads 34. The "page interval maintenance" includes various operations such as, for example, a cleaning operation of nozzles, a replenishment of ink, etc. The determination as to whether the page interval maintenance is needed during a continuous printing operation can be made in accordance with detected condition of, for example, a degree of contamination of nozzles, an amount of ink remaining in the sub-tanks 35, etc. In the present embodiment, a maintenance operation performed in a time period between printing of a preceding paper and printing of a proceeding paper (that is, the page interval maintenance in a one-side printing) is explained, but the control is applicable to a both-side printing. That is, the page interval maintenance includes a maintenance operation performed in a time period between printing of the front side of a paper and printing of the back side of the paper in a both-side printing.

Here, the "cap timer time" is measured by a timer (not illustrated in the figures). The cap timer time corresponds to a time period during which the nozzles of the recording heads 34 can be left without capping (an uncapped state) after completion of a printing operation. The capping operation refers to an operation of capping the recording heads 34 by the cap 82, and further includes a nozzle suctioning operation performed in the capped state. In other words, if the nozzles are in the uncapped state for the cap timer time or longer, the capping operation is started.

In order to prevent the nozzles from being clogged due to dryness of nozzles, it is desired to leave the nozzles in the capped state. However, if a capping operation and an uncapping operation are performed repeatedly at each interval between pages, the control process becomes complex and is not suitable for high-speed printing. Thus, it is determined whether a proceeding paper is fed after a preceding paper is fed based on the cap timer time. That is, if the cap timer time is passed, it is determined that consecutive paper feed is not performed and, thus, the capping operation is carried out.

Figure 12:
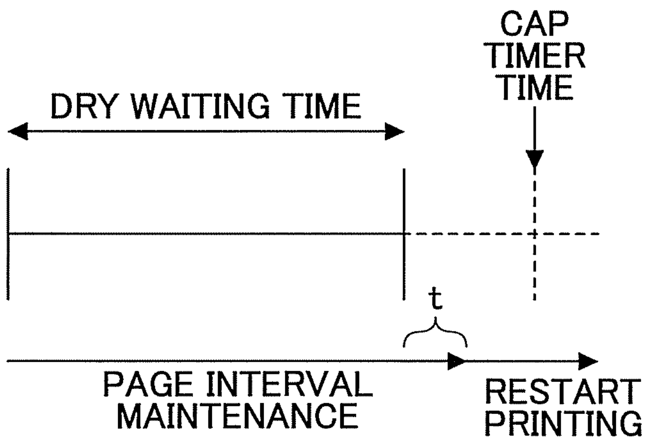
FIG. 12 is an illustration indicating a relationship between the dry waiting time, a cap timer time, page interval maintenance time, and a print restart time.

In the present embodiment, as illustrated in FIG. 12, if the set dry waiting time is shorter than the cap timer time (dry waiting time<cap timer time), and if the page interval maintenance time is longer than the dry waiting time (page interval maintenance time>dry waiting time), a subsequent printing operation is started immediately after completion of the page interval maintenance without performing a capping operation.

With regard to the page interval maintenance time, a printing restart time and need for the capping operation may be determined based on the dry waiting time, the cap timer time and the page interval maintenance time (predicted time) before performing the page interval maintenance by retaining a specific time for each type of maintenance. Alternatively, a printing restart time and need for the capping operation may be determined based on the dry waiting time, the cap timer time and the page interval maintenance time (actually measured time) after performing the page interval maintenance.

As mentioned above, what is required for a user is to just wait for a time period (indicated by t in FIG. 12), which is obtained by subtracting the dry waiting time from the page interval maintenance time, thereby eliminating an unnecessary waiting time for the user.

A description will be given below of a second embodiment. Explanation of the structures that are the same as for the first embodiment is omitted.

Figure 13:
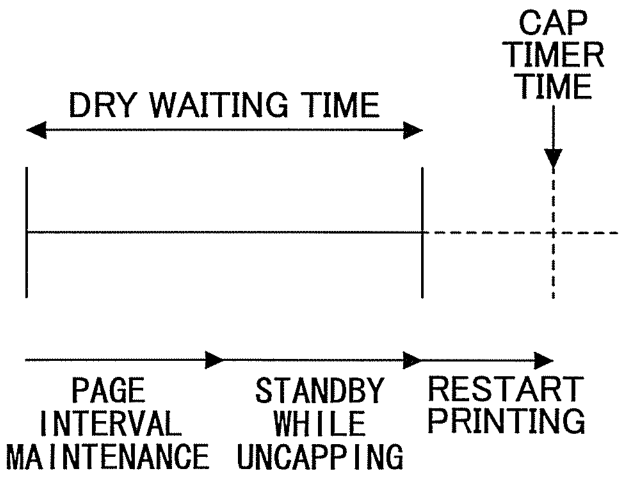
FIG. 13 is an illustration indicating another relationship between the dry waiting time, a cap timer time, page interval maintenance time, and a print restart time.

In the second embodiment, as illustrated in FIG. 13, if the set dry waiting time is shorter than the cap timer timed (dry waiting time<cap timer time), and if the page interval maintenance time is equal to or shorter than the dry waiting time (page maintenance time≦dry waiting time), a standby state is maintained for a remaining time period, which is obtained by subtracting the page interval maintenance time from the dry waiting time so that a subsequent printing operation is started after the dry waiting time has passed.

Accordingly, because the dry waiting ends before passage of the cap timer time, there is no need to perform a capping operation and the printing operation can be restarted immediately after the dry waiting time has passed. Thus, the user just waits for the time period set by the dry waiting time, thereby reducing an unnecessary waiting time for the user.

If a sum of the page interval maintenance time and the time required for the capping operation (hereinafter, referred to as capping operation time) is shorter than the dry waiting time, it is preferable to perform the capping operation after the page interval maintenance in order to prevent the nozzles of the recording heads 34 from being dried.

The "capping operation time" may be retained as a previously fixed time, but it is preferable to compute the "capping operation time" from a position of the carriage 33 at the time of end of the maintenance operation. A time period required for the capping operation in this case corresponds to a time spent on moving the carriage 33 acquired from carriage velocity profile information, which is previously stored in the ROM 202 or the like. The time spent on moving the carriage 33 corresponds to a moving distance of the carriage 33, which corresponds to a difference between a count value corresponding to a present position of the carriage 33 and a count value of the carriage 33 at a capping position.

A description will now be given of a third embodiment. Explanation of the structures that are the same as for the first and second embodiments is omitted.

Figure 14:
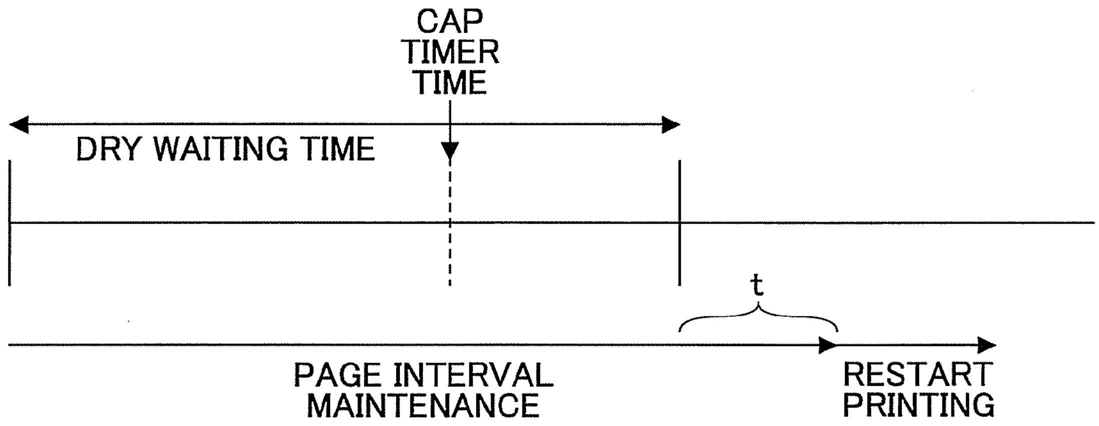
FIG. 14 is an illustration indicating a further relationship between the dry waiting time, a cap timer time, page interval maintenance time, and a print restart time.

In the third embodiment, as illustrated in FIG. 14, if the set dry waiting time is equal to or longer than the cap timer timed (dry waiting time≧cap timer time), and if the page interval maintenance time is longer than the dry waiting time (page maintenance time>dry waiting time), a subsequent printing operation is started immediately after completion of the page interval maintenance without performing a capping operation.

Accordingly, what is required for a user is to just wait for an extra time, which is obtained by subtracting the dry waiting time from the page interval maintenance time, in addition to the dry waiting time, thereby eliminating an unnecessary waiting time for the user.

A description will now be given of a fourth embodiment. Explanation of the structures that are the same as the first through third embodiments is omitted.

Figure 15:
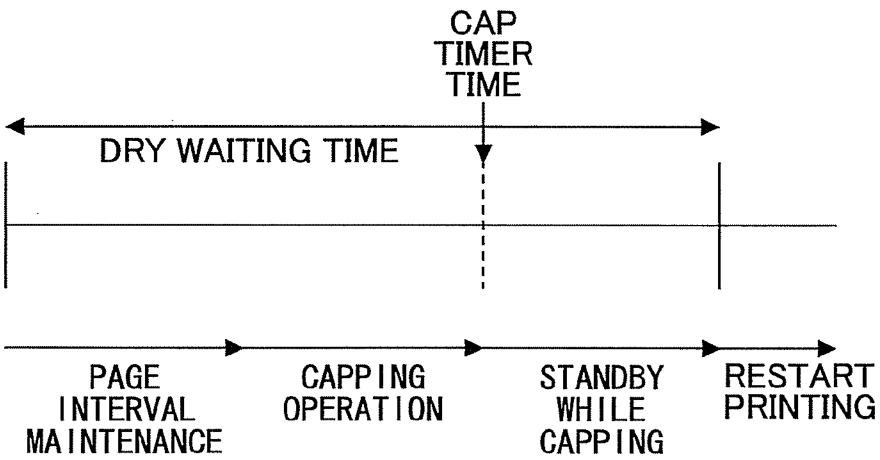
FIG. 15 is an illustration indicating yet another relationship between the dry waiting time, a cap timer time, page interval maintenance time, and a print restart time.

In the fourth embodiment, as illustrated in FIG. 15, if the set dry waiting time is equal to or longer than the cap timer timed (dry waiting time≧cap timer time), and if the page interval maintenance time is equal to or shorter than the dry waiting time (page maintenance time≧dry waiting time), a capping operation is performed immediately after completion of the page interval maintenance, and passage of a remaining time obtained by subtracting a time period spent on the page interval maintenance and the capping operation is waited for in the capped state in order to start a subsequent printing operation after the passage of the dry waiting time.

Accordingly, the user just waits for the time period set by the dry waiting time, thereby reducing an unnecessary waiting time for the user.

The determination of a difference in the time length, that is, which time is longer or shorter, between the dry waiting time, the page interval maintenance time and the cap timer time, is not necessarily made for each execution of the page interval maintenance. For example, the determination may be made only when an initial maintenance is performed after turning a power on or when a change is made in each setting value.

Moreover, because the dry waiting time corresponds to a time from a paper eject response to a paper supply request (or paper resupply request), even if a printing operation is started at the same time the dry waiting time is up, there may be a time lag from completion of the moving operation of the carriage 33 to a predetermined position until ink is discharged from the recording heads 34. Thus, in the second through fourth embodiment, it is preferable to start the printing operation from a predetermined time period (for example, 1-2 seconds) before an end of the dry waiting time. Thereby, it becomes possible to attempt a reduction in a time period from the passage of the dry waiting time to the actual start of discharge of ink. It is also preferable to require a user to arbitrarily set the predetermined time for starting the printing operation before the end of the dry waiting time.

A page interval maintenance control performed during the dry waiting time by the image forming apparatus may be performed according to a program (for example, an image forming program). Such an image forming program is preferably executed by the printer driver 217. Additionally, it is preferable to download such an image forming program through, for example, the Internet, and install the downloaded program in the image forming apparatus 302 from the information processing apparatus 301. Further, such an image forming program may be stored in a computer readable recording medium, which is readable by the image forming apparatus 302.

The present invention is not limited to the specifically disclosed embodiments, and variations and modifications may be made without departing from the scope of the present invention.

The present application is based on Japanese priority application No. 2009-208576 filed on Sep. 9, 2009, the entire contents of which are hereby incorporated herein by reference.

What is claimed is:

1. An image forming apparatus comprising:

a setting part configured to set at least one of a first waiting time and a second waiting time, the first waiting time from a completion of ejecting operation of one sheet of recording paper to a start of supply of a subsequent sheet of recording paper in a one-side printing, the second waiting time from a completion of an ejecting operation of one sheet of recording paper to a start of resupply of said one sheet of recording paper in both-side printing;

a recording head maintenance part configured to start a maintenance operation of a recording head simultaneously with a start of a counting operation of said first or second waiting time; and a determining part configured to detect a difference in time length between said first or second waiting time, a maintenance time required by said maintenance operation and a cap timer time, which is a time during which a nozzle of said recording head is allowed to be maintained in a state where the nozzle is uncapped, and to determine a time of restarting a printing operation after execution of said maintenance operation based on the detected difference.

2. The image forming apparatus as claimed in claim 1, wherein, when said first or second waiting time is shorter than said cap timer time and said maintenance time is longer than said first or second waiting time, said determining part restarts the printing operation after completion of said maintenance operation.

3. The image forming apparatus as claimed in claim 1, wherein, when said first or second waiting time is shorter than said cap timer time and said maintenance time is equal to or shorter than said first or second waiting time, said determining part restarts the printing operation when said first or second waiting time has passed while said nozzle of said recording head is uncapped for a remaining time after passage of said first or second waiting time.

4. The image forming apparatus as claimed in claim 1, wherein, when said first or second waiting time is equal to or longer than said cap timer time and said maintenance time is longer than said first or second waiting time, said determining part restarts the printing operation after completion of said maintenance operation.

5. The image forming apparatus as claimed in claim 1, wherein, when said first or second waiting time is equal to or longer than said cap timer time and said maintenance time is equal to or shorter than said first or second waiting time, said determining part restarts the printing operation when said first or second waiting time has passed while said nozzle of said recording head is capped for a remaining time after passage of said first or second waiting time.

6. An image forming system comprising: an image forming apparatus as claimed in claim 1; and an information processing apparatus sending a print job to said image forming apparatus.

7. A Non-Transitory computer readable recording medium storing an image forming program causing an image forming apparatus to perform an image forming method, said image forming apparatus including:

a setting part configured to set at least one of a first waiting time and a second waiting time, the first waiting time from a completion of ejecting operation of one sheet of recording paper to a start of supply of a subsequent sheet of recording paper in a one-side printing, the second waiting time from a completion of ejecting operation of one sheet of recording paper to a start of resupply of said one sheet of recording paper in both-side printing; and a recording head maintenance part configured to start a maintenance operation of a recording head simultaneously with a start of a counting operation of said first or second waiting time, said image forming method comprising: detecting a difference in time length between said first or second waiting time, a maintenance time required by said maintenance operation, and a cap timer time, which is a time during which a nozzle of said recording head is allowed to be maintained in a state where the nozzle is uncapped;

determining a time of restarting a printing operation after execution of said maintenance operation based on the detected difference; and causing said image forming apparatus to restart the printing operation at the determined time.

* * * * *